US012676744B2

(12) United States Patent
Kalli et al.

(10) Patent No.: US 12,676,744 B2
(45) Date of Patent: Jul. 7, 2026

(54) SUBSTITUTE USER INTERFACE FOR SENSITIVE DATA

(71) Applicant: Home Depot Product Authority, LLC, Atlanta, GA (US)

(72) Inventors: Ravi Kalli, Cumming, GA (US); Apekshith Ramesha, Sugar Hill, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 18 days.

(21) Appl. No.: 18/800,427

(22) Filed: Aug. 12, 2024

(65) Prior Publication Data

US 2026/0046125 A1     Feb. 12, 2026

(51) Int. Cl.
    *H04L 9/08*          (2006.01)
(52) U.S. Cl.
    CPC .................................... *H04L 9/088* (2013.01)
(58) Field of Classification Search
    None
    See application file for complete search history.

(56) References Cited

U.S. PATENT DOCUMENTS

| | | | |
|---|---|---|---|
| 5,784,464 A | 7/1998 | Akiyama | |
| 8,316,237 B1 | 11/2012 | Felsher | |
| 8,418,050 B2 * | 4/2013 | Minagawa | ........... G06V 30/412 |
| | | | 715/221 |

| | | | |
|---|---|---|---|
| 8,651,374 B2 | 2/2014 | Brabson | |
| 8,706,577 B2 * | 4/2014 | Stringfellow | .......... G06Q 20/40 |
| | | | 705/17 |
| 11,188,901 B2 * | 11/2021 | Karpenko | .......... G06Q 20/3829 |
| 2008/0126213 A1 | 5/2008 | Robertson | |
| 2008/0319909 A1 | 12/2008 | Perkins | |
| 2016/0012430 A1 | 1/2016 | Chandrasekaran | |
| 2017/0278085 A1 * | 9/2017 | Anderson | ............ G06Q 20/405 |
| 2018/0308093 A1 | 10/2018 | Oder, II | |
| 2018/0314827 A1 | 11/2018 | Wells | |
| 2019/0286691 A1 * | 9/2019 | Sodhani | ................ G06F 40/174 |
| 2021/0209138 A1 * | 7/2021 | Sureshkumar | .......... G06F 16/38 |
| 2023/0082200 A1 | 3/2023 | Ozvat | |
| 2023/0401564 A1 * | 12/2023 | Barrett | ............... G06Q 20/3829 |
| 2024/0193595 A1 * | 6/2024 | Dahn | ............... G06Q 20/38215 |

OTHER PUBLICATIONS

International Search Report and Written Opinion of application No. PCT/US2025/040915, dated Oct. 21, 2025, 11 pp.

* cited by examiner

*Primary Examiner* — Amir Mehrmanesh
*Assistant Examiner* — Hassan Saadoun
(74) *Attorney, Agent, or Firm* — Greenberg Traurig, LLP

(57)          ABSTRACT

A server-implemented method includes receiving a request from a user to initiate a computing action, determining that an interface service of a third party for collecting information from the user for the computing action is not available, presenting a substitute interface that matches an appearance respective of the third-party interface service in response to the determination, receiving, via the substitute interface, information for the computing action, encrypting the receiving information to generate encrypted computing action information, and transmitting the encrypted computing action information to the third party to initiate the computing action.

20 Claims, 8 Drawing Sheets

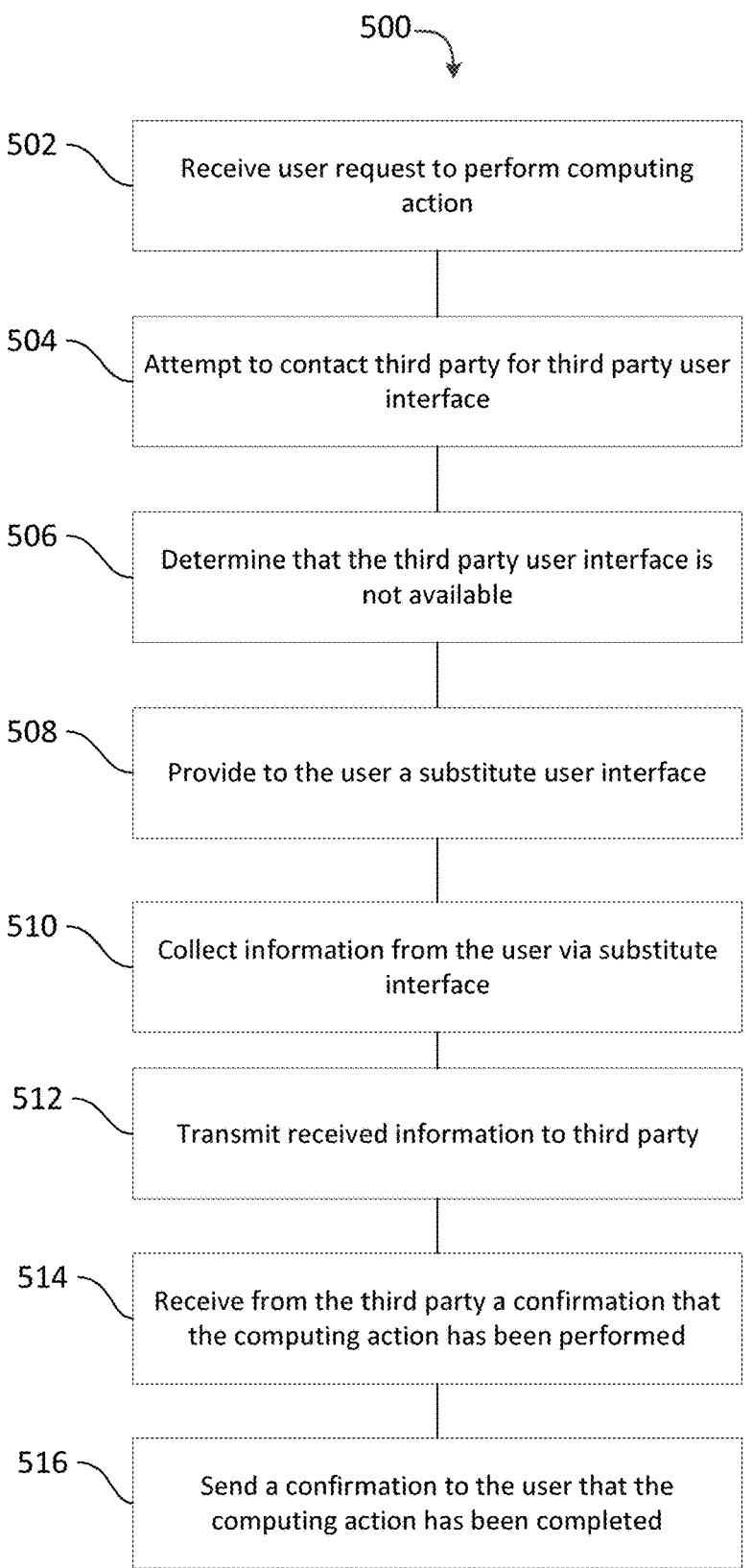

500

502 — Receive user request to perform computing action

504 — Attempt to contact third party for third party user interface

506 — Determine that the third party user interface is not available

508 — Provide to the user a substitute user interface

510 — Collect information from the user via substitute interface

512 — Transmit received information to third party

514 — Receive from the third party a confirmation that the computing action has been performed 516 — Send a confirmation to the user that the computing action has been completed

*FIG. 5*

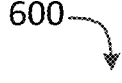
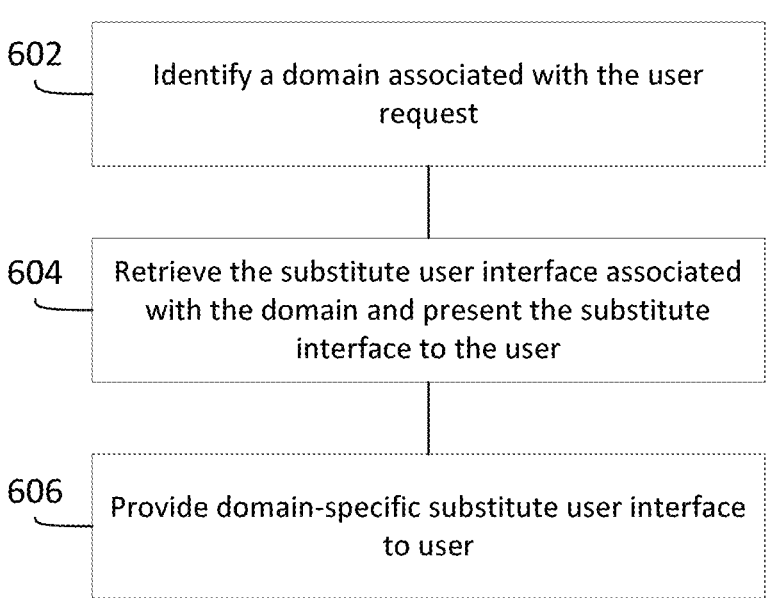
602    Identify a domain associated with the user request
604    Retrieve the substitute user interface associated with the domain and present the substitute interface to the user
606    Provide domain-specific substitute user interface to user
FIG. 6

700

702 — Receive at least one encryption key from a third party

704 — Store the encryption key in a storage module within the system

706 — Collect user information

708 — Encrypt the user information

710 — Forward the encrypted user information to the third party

712 — Delete the user's provided information

SUBSTITUTE USER INTERFACE FOR SENSITIVE DATA

TECHNICAL FIELD

This disclosure generally relates to processing computing actions in the absence of inter-system connectivity, including an absence of connectivity between a processing system and a token service provider user interface service.

BACKGROUND

Computing systems may include a server, a request processing system, and a third-party service provider. When a user instructs a computing action, the server may contact the request processing system, which in turn may request the third-party service provider to provide a user interface in which the user inputs information required to complete the computing action.

BRIEF DESCRIPTION OF THE DRAWINGS

FIG. 5 is a flowchart illustrating an example method of performing computing actions using a substitute computing action interface.

FIG. 6 is a flowchart illustrating an example method of providing a substitute computing action interface.

DETAILED DESCRIPTION

Token service providers (TSPs) and other third parties provide user interface services through which a user can enter confidential and other sensitive information (e.g., for use with a website or other electronic user interface). The interface service may be requested by a processing system in response to a user initiating a computing action that requires entry of sensitive information. When available, the TSP or other third party may provide a user interface portion (e.g., which the processing system may present in a webpage sub-window) for the user to enter information. The user-entered information is received directly by the TSP or other third party.

Like all electronic services, a user interface service of a TSP may be unavailable from time to time due to a network or other failure between the TSP interface service and the processing system. In such instances, one approach is to inform the user that the service is down and prompt the user to continue the computing action at a later time when the service is available. Another approach, disclosed herein, is for the processing system to provide a substitute interface such that the user is presented with an identical experience regardless of the status of the TSP interface service. Such a substitute interface improves the functionality of the processing system by, for example, enabling it to function in the absence of communication with the third-party interface service, and by minimizing the quantity of status checks that need to be performed between the processing system and the interface service.

Figure 1:
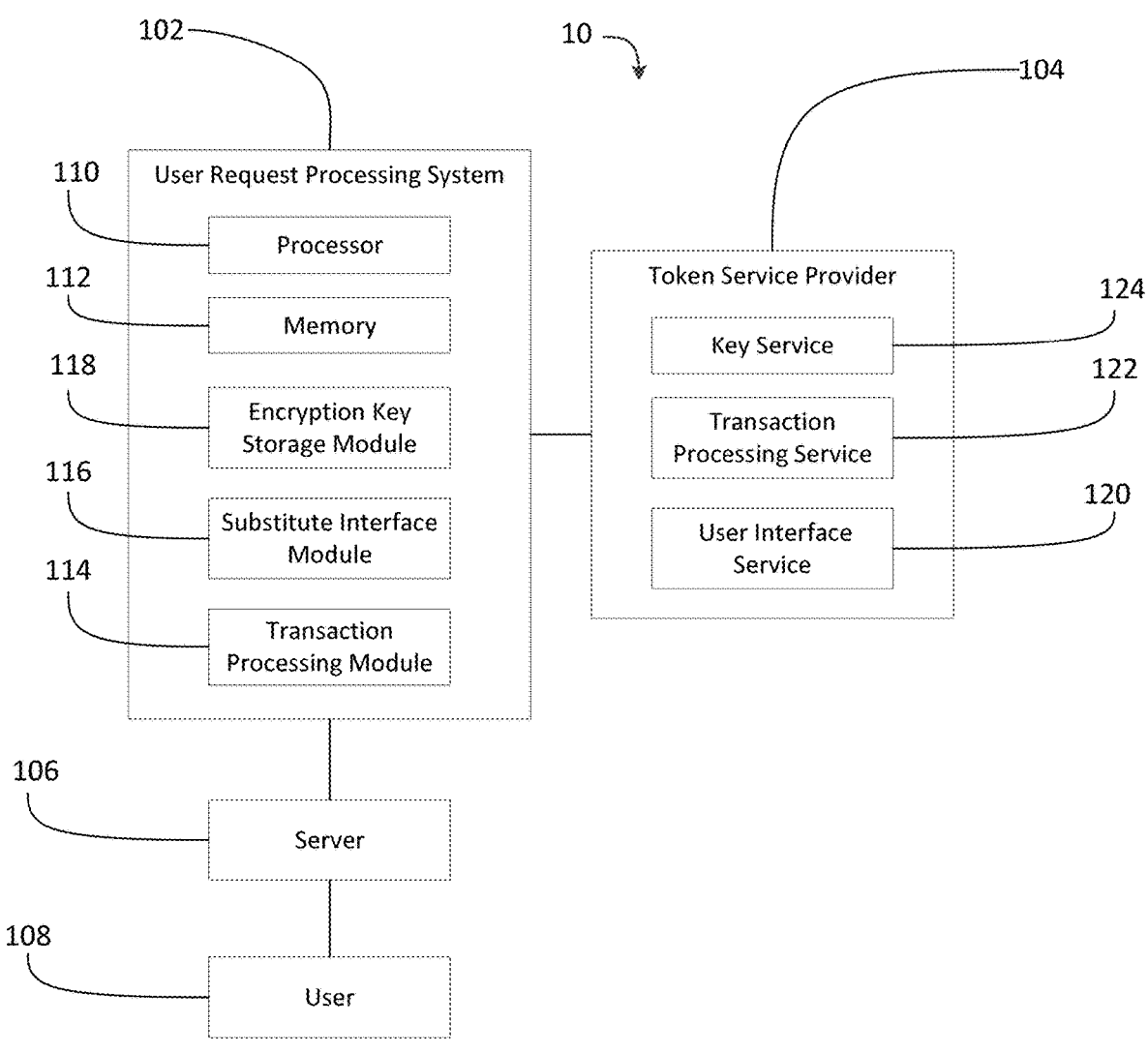
FIG. 1 is a block diagram view of an example system for processing a user-instructed computing action.

Referring to the drawings, wherein like reference numerals refer to the same or similar features in the various views, FIG. 1 is a block diagram view of an example system 10 for providing a substitute user interface for use in completing computing actions. The system 10 may include a user request processing system 102 and a token service provider 104. The user request processing system 102 may communicate with or be hosted by a server 106, and the server may communicate with the request processing system 102, a user 108, and/or other computing components. Accordingly, the functionality of the user request processing system 102 may be server-implemented, in some embodiments.

The user request processing system 102 may be associated with a particular electronic interface and/or platform through which users perform electronic computing actions. For example, the user request processing system 102 may be associated with a website, mobile application, etc. Accordingly, the user request processing system 102 may be associated with one or more servers (e.g., the server 106), which server(s) may host the website, mobile application, etc., and through which the user computing devices may access the website, mobile application, etc.

The user request processing system 102 may include a processor 110 and a non-transitory, computer-readable memory 112 storing instructions that, when executed by the processor 110, cause the request processing system 102 to perform one or more processes, operations, methods, algorithms, etc. of this disclosure. The request processing system 102 may include one or more functional modules. Specifically, the request processing system 102 may include a transaction processing module 114, a substitute interface module 116, and an encryption key storage module 118.

The transaction processing module 114 may receive requests from users to initiate and/or complete computing actions. Such a computing action may be, for example, an inter-party transaction, updating a confidential data store, accessing a secure computing system, and/or another computing action that could be facilitated by a third-party interface for secure data entry. The transaction processing module 114 may perform or facilitate performance of the computing action. In some embodiments, the transaction processing module 114 may communicate with the token service provider 104 to facilitate the computing action. Further, the transaction processing module 114 may determine whether or not a user interface service 120 of the token service provider 104 is available and take appropriate action based on that availability or unavailability.

The substitute interface module 116 may provide a user interface, such as an interface for secure data entry. The substitute interface module 116 may provide such an interface when a primary interface that would be provided by a third party (e.g., by the token service provider 104) is unavailable, such as when the third-party interface service is down or otherwise unavailable. The substitute interface module 116 may provide an interface that matches or otherwise mimics the primary interface.

In some embodiments, the substitute interface module 116 may include multiple interface versions, each specific to a particular domain serviced by the user request processing system. For example, the user request processing system 102 may support a first domain, ExampleABCD.com, as well as a second domain, ExampleWXYZ.com. Each domain may have its own respective interface appearance, arrangement, etc. Accordingly, the substitute interface module 116 may store and provide a respective interface for each domain and may provide the appropriate interface in response to user requests received through a respective domain (e.g., the interface for ExampleABCD.com in response to requests received through ExampleABCD.com, and the interface for ExampleWXYZ.com in response to requests received through ExampleWXYZ.com).

The encryption key storage module 118 may be or may include a store of one or more encryption keys which may be used for encryption of information transmitted by the transaction processing module 114, information received through the substitute interface module 116 and then transmitted, and/or other information. The one or more encryption keys may be received from a third party, such as the token service provider 104, in some embodiments.

In some embodiments, the user request processing system 102 may use encryption keys from the encryption key storage module 118 in a domain-specific manner. For example, the user request processing system 102 may use a first key (or set of keys) for a first domain, a second key (or set of keys) for a second domain, and so on, and may replace one or more keys upon an indication of a security issue with the relevant domain, for example. The encryption key storage module 118 may therefore be able to encrypt user information for an extended period of time without the need to request additional encryption keys from a key service. The encryption key storage module 118, and thus the user request processing system 102, may therefore be able to operate for an extended period of time, even if a key service becomes unavailable.

The token service provider 104 may provide three services, among others: a user interface service 120, a key service 124, and a transaction processing service 122. Each of the services may be provided to facilitate computing actions instructed to the user request processing system 102.

The user interface service 120 may provide a user interface into which a user 108 may securely enter information. For example, the user interface service 120 may provide a user interface for entry of financial information, personally identifying information, passwords, etc.

The transaction processing service 122 may process, or complete, a computing action (or facilitate such processing or completion). For example, the transaction processing service 122 may receive computing action information via the user interface service 120, and/or computing action information from the user request processing system 102, and perform one or more operations in furtherance of the requested computing action. For example, where the computing action is an inter-party transaction, the transaction processing service 122 may communicate with a counterpart processing service of a second party to the transaction in order to cause the exchanges instructed in the transaction. Where the computing action is updating a confidential data store, the transaction processing service 122 may communicate with the data store to perform the update. Where the computing action is accessing a secure computing system, the transaction processing service 122 may communicate with the secure computing system to negotiate and confirm access.

The key service 124 may generate encryption keys for distribution to and use by other systems, such as the user request processing system 102. In some embodiments, the key service 124 may generate keys in pairs (e.g. an encryption key and a paired decryption key), distribute one key, and maintain the other. Accordingly, the key service 124 may enable transmission of encrypted information between the token service provider 104 and another system, such as the user request processing system 102.

The user request processing system 102 and the token service provider 104 may each have one respective key of one or more key pairs, in embodiments. For example, the key service 124 may generate a plurality of key pairs and, for each key pair, distribute the encryption key to the user request processing system 102 for storage in the encryption key storage module 118. The key service 124 may maintain the decryption key. As a result, the user request processing system 102 can use an encryption key to encrypt information, transmit the encrypted information to the token service provider 104, and the token service provider 104 can use the paired decryption key to decrypt the information for further processing.

The instant disclosure makes reference to transactions between parties. Transactions are used herein as an example of computing actions in which collection of sensitive information is relevant. The instant disclosure may also find use with many other types of computing actions, such as access to secured computing systems, updating a secure data store, and the like. In embodiments involving computing actions other than inter-party transactions, the transaction processing system 102 may instead be another processing system with which users interact to instruct computing actions involving the transmission of sensitive information.

In operation, the user request processing system 102 and the TSP 104 may cooperate to effect user-instructed computing actions. For example, the server 106 may host a user interface that is supported by the user request processing system 102 and by the TSP 104. The user 108 may enter a request (e.g., instruction) to initiate or complete a computing action through the interface, and that computing action may require secure entry of information. The transaction processing module 114 may receive the request and instruct the token service provider 104 to provide a user interface for the entry of such information, and the TSP 104 transaction processing service 122 may carry out the requested computing action. If the user interface service 120 is available, the user interface service may provide the required interface. If user interface service 120 is not available, the transaction processing module 114 may cause the substitute interface module 116 to provide a substitute interface. The substitute interface module 116 may receive information from the user and, using a key from the encryption key storage module 118, encrypt the received information. The user request processing system 102 may then transmit the encrypted information to the TSP 104 transaction processing service 122, and the TSP 104 transaction processing service 122 may carry out the requested computing action.

The instant disclosure makes reference to a token service provider 104. It should be understood that a token service provider 104 is one example of a third-party computing system that may support computing actions. This disclosure may also find use in connection with other third-party computing services, particularly those services that provide an interface for direct user entry of sensitive information.

Figure 2:
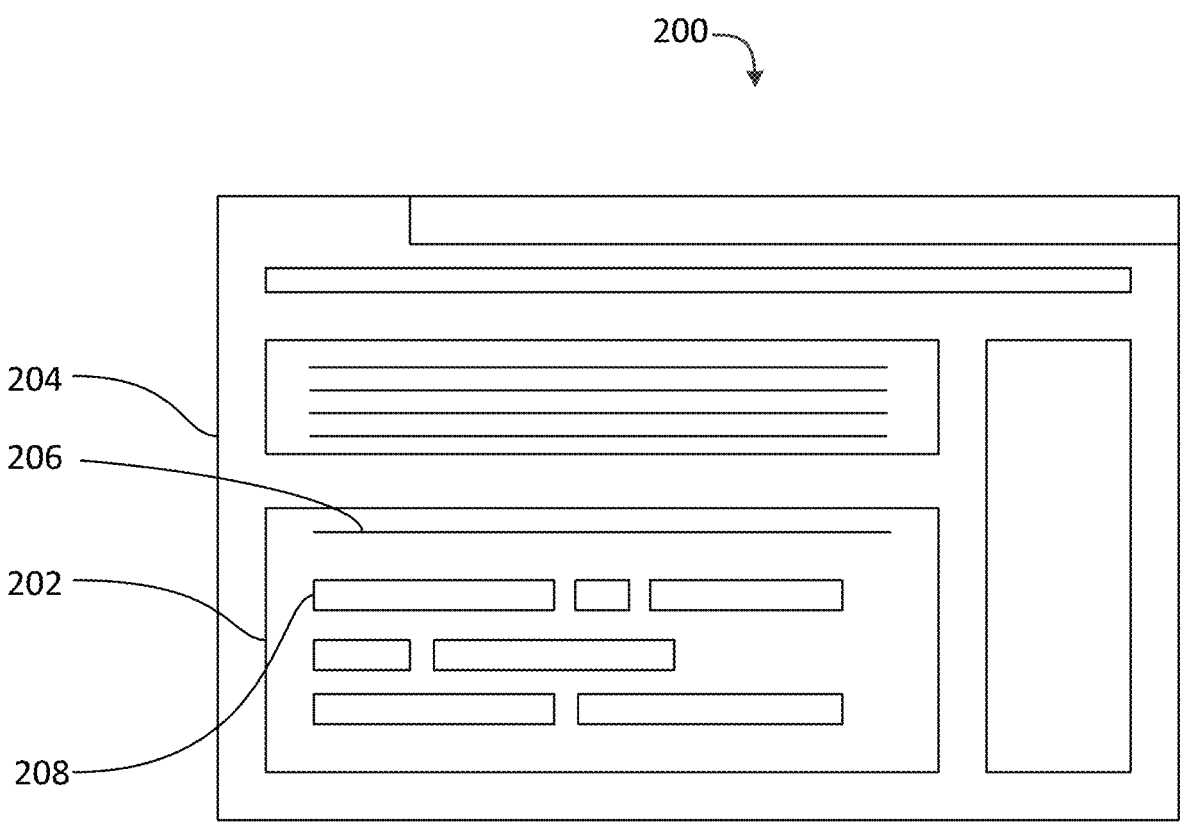
FIG. 2 is a diagram view of an example user interface provided for a computing action.

FIG. 2 is a diagrammatic view of an example user interface 200 that may be provided in conjunction with the system of FIG. 1. The user interface 200 may be, for example, a website, application, and the like. A portion of that interface 202 may be provided by or through a third-party service, such as the TSP user interface service. That is, the user interface portion 202 provided by the user interface service may be integrated into a larger electronic interface 204 which is hosted by the server, such as in a window within a webpage. The user interface portion 202 may include text 206, images, and one or more fillable boxes 208, text-fillable fields, radio buttons, check boxes, and/or other information entry portions 208. The text 206 of the user interface 202 may include instructions to the user on what information is required to complete a computing action. The information entry portions 208 may be accessible to and used by the user to enter in the information required to complete the computing action. The information entered into the user interface 202 by the user may be used to complete a computing action.

Referring to FIGS. 1 and 2, as noted above, when the user interface service 120 is unavailable, the substitute interface module 116 may provide an interface portion 202 that is similar (e.g., identical) to the interface portion that would have been provided by the user interface service 120. Accordingly, from the user's 108 perspective, the user interface 200 may appear to be the same whether the interface portion 202 is provided by the user interface service 120 or by the substitute interface module 116.

The user interface portion 202 provided by the user interface service 120 or the substitute interface module 116 may be provided in response to a user request to perform or complete a computing action. Accordingly, the user 108 may instruct a computing action through a first portion of the user interface 200 and, in response, the server may provide the interface portion 202 (e.g., either from the user interface 120 service or from the substitute interface module 116).

Where the interface portion 202 is provided by the user interface service 120 of the TSP 104, the user interface service 120 may open a direct connection to the user device 108 with a separately encrypted connection, via a dedicated window for the user interface portion 202. In such an embodiment, the user interface service 120 may receive encrypted information directly from the user device 108 that is not known to, or intelligible to, the server 106 or the user request processing system 102.

In contrast, where the interface portion 202 is provided by the substitute interface module 116, user information entered through the substitute interface portion 116 may be transmitted over the same channel as the user's 108 other interactions with the broader user interface 200 (which interactions may also be transmitted to the server 106 over an encrypted channel). In turn, the user request processing system 102 may encrypt the received information and transmit the encrypted information to the TSP 104 in order for the instructed computing action to be carried out.

Figure 3:
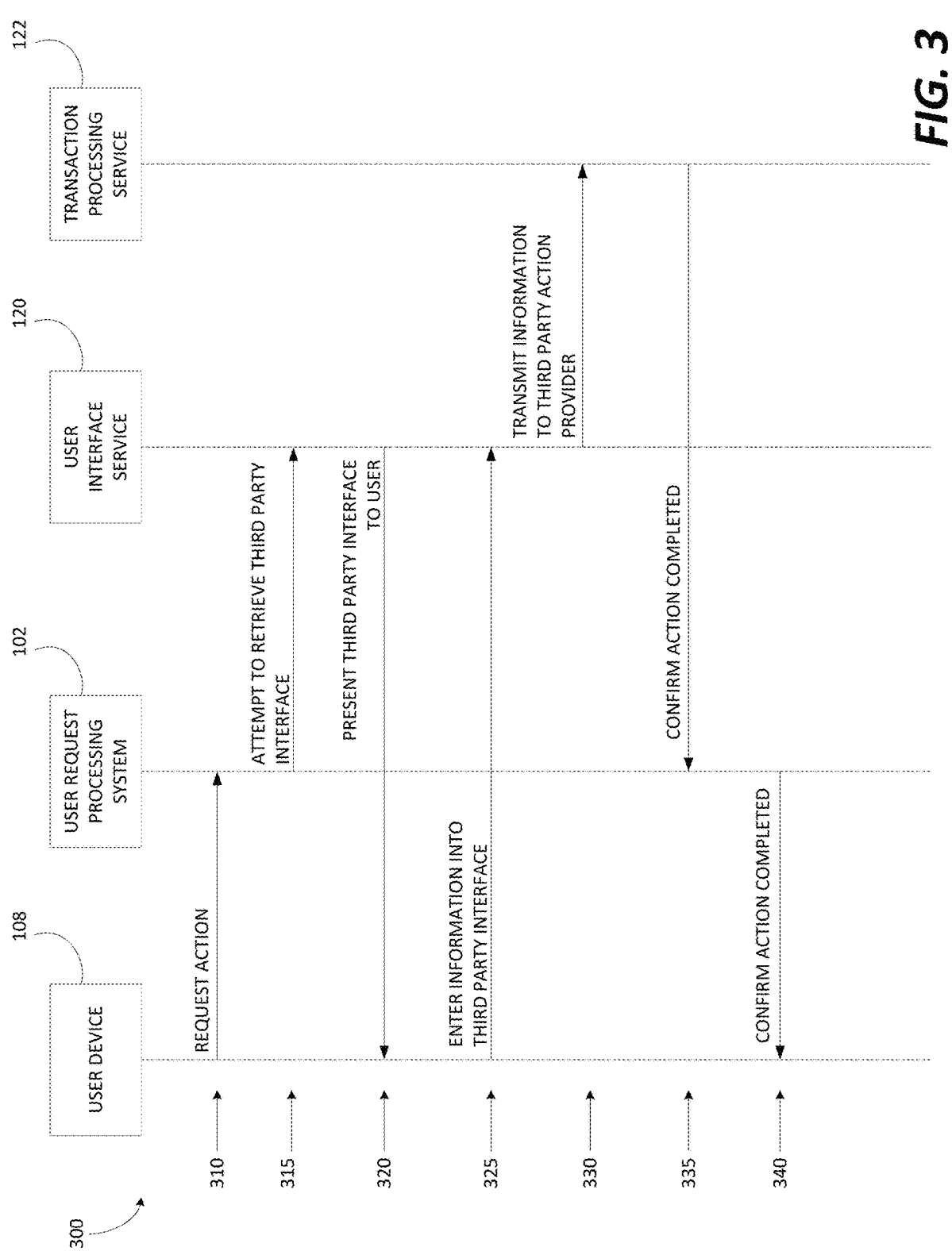
FIG. 3 is a sequence diagram illustrating an example operation of the system of FIG. 1 with active communication with a third-party user interface service.

FIG. 3 is a sequence diagram illustrating a method 300 of processing a user-instructed computing action. The method may include, at operation 310, a user device 108 transmitting a request to complete a computing action. The user request processing system 102 (e.g. through a transaction processing module) receives the request to complete a computing action and in response, at operation 315, the transaction processing module of the user request processing system 102 attempts to retrieve the third-party interface provided by the user interface service 120 of the token service provider. The attempt may be, for example, an instruction or request transmitted to the user interface service 120 for the user interface service 120 to provide the needed user interface directly to the user device. In response to the request at operation 320, the user interface service 120 presents its third-party interface to the user device 108. Operation 320 may include the user interface service 120 opening a dedicated encrypted channel with the user device 108.

At operation 325, the user may input information into the third party interface portion via/the user device 108. The user interface service 120 receives the user-entered information (e.g., via the dedicated channel opened at operation 320) and, at operation 120, transmits the user-entered information to a third-party action provider, which in this example is a transaction processing service 122 of a token service provider. The transaction processing service 122 completes the computing action and, at operation 335, transmits a notification confirming that the computing action has been completed to the transaction processing module of the user request processing system 102. In response, at operation 340, the user request processing system 102 may transmit a notification that the computing action has been completed to the user device 108.

Figure 4:
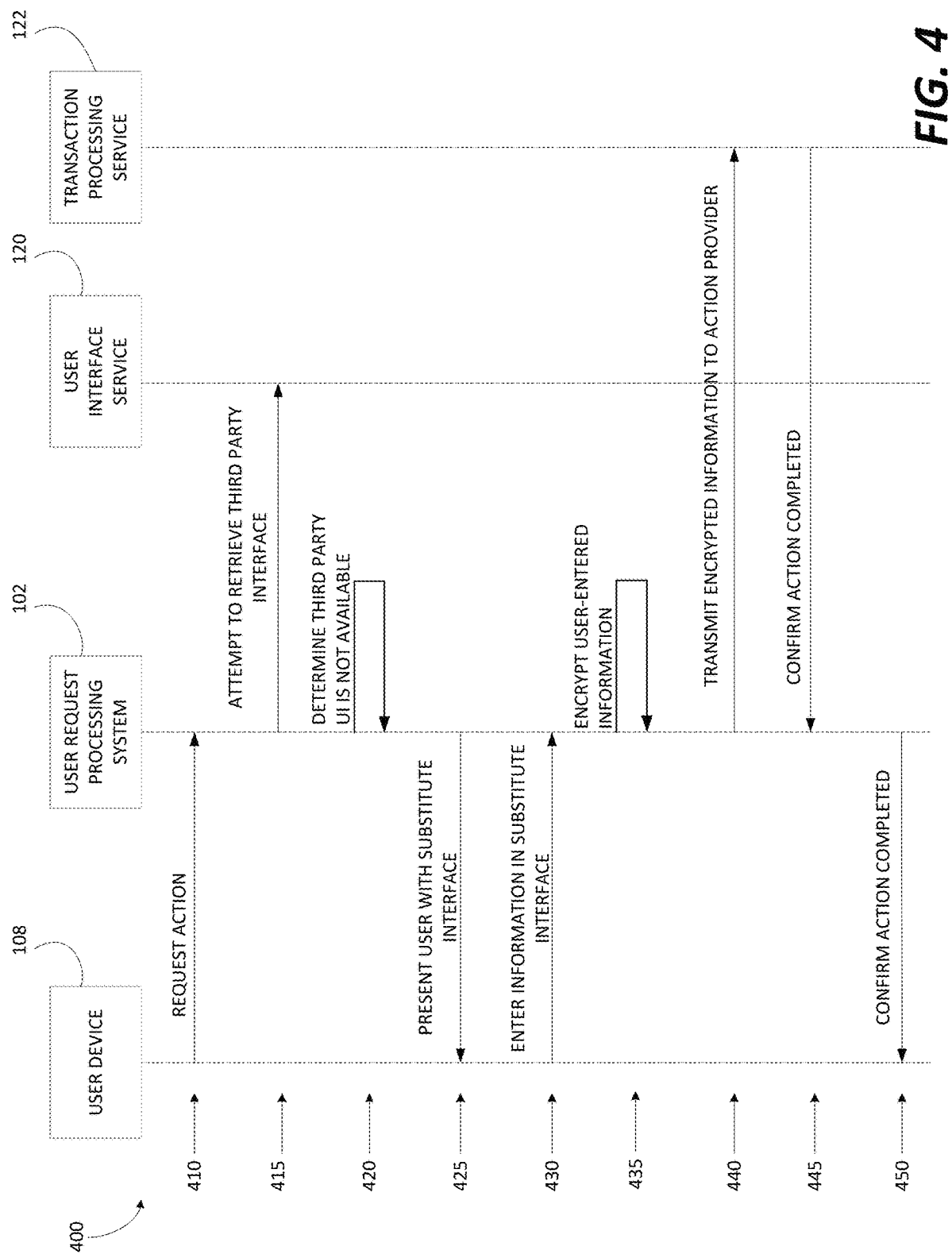
FIG. 4 is a sequence diagram illustrating an example operation of the system of FIG. 1 without active communication with a third-party user interface service.

FIG. 4 is a sequence diagram illustrating an example method 400 of processing a user-instructed computing action. The method may include, at operation 410, a user device 108 transmitting a request to complete a computing action. The user request processing system 102 receives the request to complete the computing action and, in response, at operation 415, the user request processing system 102 attempts to contact the third-party interface service 120. The attempt may be, for example, an instruction or request transmitted to the user interface service 120 for the user interface service 120 to provide the needed user interface directly to the user device 108.

The user interface service 120 may be unavailable due to a network or other failure between the user interface service 120 and the user request processing system 102. At operation 420, the user request processing system 102 determines that the user interface service 120 is not available. The determination that the user interface service is not available may be, for example, the user request processing system 102 receiving an error message from the user interface service 120, or for example, the transaction processing module of the user request processing system 102 receiving no response from the user interface service 120. Operations 415 and 420, may be performed by the transaction processing module 114 of FIG. 1, for example.

In response to the user request processing system 102 determining that the third-party user interface service is not available, the method may include, at operation 425, the user request processing system 102 presenting a substitute user interface to the user device 108. The substitute user interface may be provided by the substitute user interface module 116 of FIG. 1, for example.

At operation 425, in some embodiments, the user request processing system 102 may recognize a request from a user device 108 as being associated with a particular domain (e.g., website), such as having been entered by the user through the interface of that domain. In response, the user request processing system 102 may access and provide a substitute user interface from a plurality of substitute user interfaces stored in memory, the chosen substitute user interface corresponding to the particular domain. The chosen substitute user interface may be substantially the same in appearance as the user interface normally provided by the user interface service 120 when the user interface service 120 is available.

At operation 430, the user may input information into the substitute user interface via the user device 108. The method may further include, at operation 430, the user request processing system 102 receiving or collecting the user-entered information (e.g., via direct communication between the user device 108 and the user request processing system 102). The method may further include, at operation 435, the user request processing system 102 encrypting the user-entered information. At operation 435, the user request processing system 102 may utilize an encryption key stored by the user request processing system 102 (e.g., in the encryption key storage module 118 of FIG. 1) that was received from the transaction processing service 122.

At operation 440, the user request processing system 102 transmits the encrypted user-entered information to a third-party action provider, which in this example is a transaction processing service 122 of a token service provider. The transaction processing service 122 completes the computing action and, at operation 445, may transmit a notification, confirming that the computing action has been completed, to the user request processing system 102. In response, at operation 450, the user request processing system 102 may transmit a notification that the computing action has been completed to the user device 108.

FIG. 5 is a flowchart illustrating an example method 500 for processing a user-instructed computing action. The method 500, or one or more aspects of the method 500, may be performed by the user request processing system, in some embodiments. Accordingly, one or more portions of the method 500 may be embodied as instructions in the memory, in some embodiments.

The method may include, at block 502, receiving a user request to complete a computing action. The computing action may be, for example, an inter-party transaction, updating a confidential data store, accessing a secure computing system, and/or another computing action that could be facilitated by a third-party interface for secure data entry. The request may be received via a user interface, such as a website, mobile application, etc. The request may be in the form of an instruction to checkout, for example, when the computing action is a transaction between the user and a proprietor of the user interface.

The method may further include, at block 504, attempting to contact a third-party system to request a third-party user interface. The attempt to contact a third-party system may be, for example, an instruction or request transmitted to the user interface service for the user interface service to provide the needed user interface directly to the user device.

The method may further include, at block 506, determining that the third-party user interface is not available. The determination that the user interface service is not available may include, for example, receiving an error message from the user interface service. Additionally or alternatively, the determination that the user interface service is not available may include, for example, receiving no response from the user interface service.

The method may further include, at block 508 providing a substitute user interface. Block 508 may be performed in response to determining that the third-party user interface is not available. The substitute user interface may be substantially identical to the interface that would have been provided by the third party interface service, in some embodiments. The substitute user interface may contain a combination of instructions and fillable boxes, indicating to the user the information required to complete the requested computing action, for example.

In some embodiments, block 508 may include launching or otherwise defining a micro-frame in the user interface through which the user request was received, and providing the substitute interface in the micro-frame. Accordingly, the substitute interface may occupy only a portion of the overall user interface, in some embodiments.

The method may further include, at block 510, collecting, via the substitute user interface, information from the user.

For example, the user information may be received and collected via fillable boxes or other user input portions of the substitute interface. Block 510 may include converting the received user information into a format capable of being transmitted to a third-party, such as a TSP. The collected information may be or may include, for example, information related to the requested computing action, such as information for completing the computing action. In an embodiment in which the requested computing action is an inter-party transaction, the collected information may include identifying information respective of the requesting user, payment information, information for identifying an asset to be exchanged, etc. Where the requested computing action is access to a shared computing resource, the collected information may include login information for the shared computing resource, identifying information for the user, confidential information to be processed by the shared resource, and the like. Where the requested computing action is access to a secure physical site, the collected information may include user identifying information, information respective of portions of the site to which the user intends to access, etc.

The method may further include, at block 512, transmitting the user information to a third party, which in an example may be a token service provider. The third party may use the user information to complete the computing action. For example, the third party may verify that the information provided by the user matches stored information within the third party system. In an example, in an inter-party transaction, the third party may communicate the user's entered information to a counterpart service of a second party to the transaction to cause the exchanges instructed in the transaction.

The method may further include, at block 514, receiving a communication from the third party that the computing action has been performed. In an example, block 514 may include contacting the third party to confirm whether the requested computing action has been successfully completed.

The method may further include, at block 516, sending a confirmation to the user that the computing action has been completed. In an example, the confirmation to the user that the computing action has been completed may be an update to the user interface appearing on the user device, for example, a re-direct of the user device's webpage (or a defined micro-frame containing the substitute interface) to a new webpage (or interface portion within the micro-frame) containing a confirmation message. In an example, block 516 may include transmitting to the user device a separate confirmation message such as an email, text message, pop-up window, etc.

FIG. 6 is a flowchart illustrating an example method 600 of providing a user with a substitute user interface for completing a computing action when a third-party user interface has not been provided (i.e. is not available) to a user. The method 600, or one or more portions of the method 600, may be performed by the user request processing system 102 of FIG. 1, in some embodiments. The method 600 may be an embodiment of block 508 of the method 500 of FIG. 5, for example. Accordingly, the method 600 may be performed in response to a user request to perform a computing action.

The method 600 may include, at block 602, identifying a domain associated with the user request. In an example, the domain may be a domain corresponding to a website, application, etc. through which the user request was received. In another example, the domain may be one specified in the user request.

The method may further include, at block 604, retrieving a substitute user interface associated with the domain from a plurality of substitute user interfaces. The plurality of substitute user interfaces may each be specific to a respective domain. The plurality of substitute user interfaces may differ from each other with respect to quantity or arrangement of user input portions, colors, text, or other content or appearance aspects. Each substitute user interface may substantially match an interface that would be provided by a third-party interface service for the relevant domain. That is, each substitute user interface may have substantially the same appearance as the relevant third-party user interface by having the same text, images, user input portions, color scheme, layout, etc. (thus visually appearing substantially the same).

In an example, one substitute interface of the plurality of substitute interfaces may be intended for use for many different domains, and which may not be the same in appearance as a user interface provided by a user interface service of a third party for any of those domains.

The method may further include, at block 606, providing the domain-specific substitute user interface to a user device. Block 606 may include providing the domain-specific substitute user interface in response to a user request respective of the domain.

Figure 7:
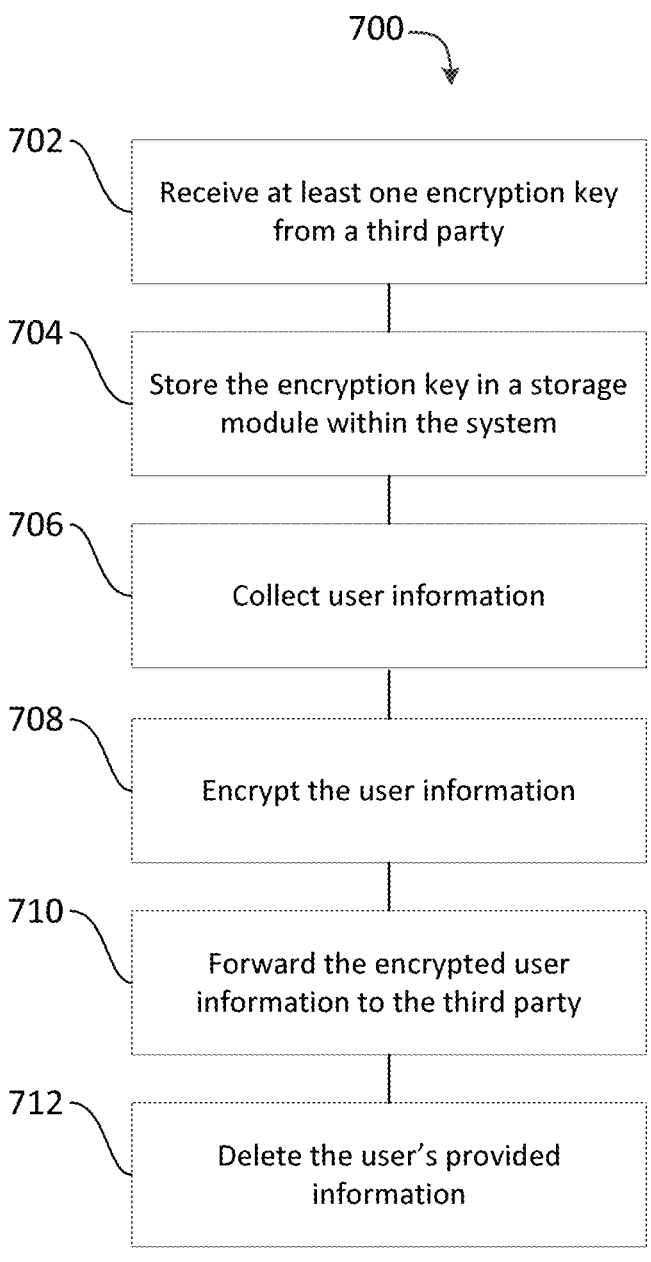
FIG. 7 is a flowchart illustrating an example method of performing encrypted computing actions using a substitute computing action interface.

FIG. 7 is a flowchart illustrating an example method 700 for handling user information entered into a substitute user interface. The method 700, or one or more aspects of the method 700, may be performed by the user request processing system 102 of FIG. 1, in some embodiments.

The method 700 may include, at block 702, receiving, by the user request processing system and/or the encryption key storage module, at least one encryption key from a third party, in an example a key service of a TSP. In some embodiments, block 702 may include receiving a plurality of encryption keys.

The method 700 may further include, at block 704, storing, by the user request processing system, the received at least one encryption key. In some embodiments, the decryption key associated with each encryption key may not be stored by or accessible to the system performing the method 700.

The method 700 may further include, at block 706, collecting user information via a substitute user interface. Block 706 may be substantially the same as block 510 of FIG. 5, in some embodiments.

The method 700 may further include, at block 708, encrypting the received user information by using an encryption key from the one or more received encryption keys. In some embodiments, block 708 may include retrieving the encryption key from a local memory or database of the system performing the method 700. In another embodiment, block 708 may include requesting the encryption key from a third-party key service (that is, blocks 702 and 708 may be performing in conjunction). In some embodiments, block 708 may include deleting the unencrypted version of the received user information after encrypting it. In some embodiments, encrypting at block 708 may be performed as close to instantaneously after receiving the user information at block 706 as possible, such that the user information may exist in unencrypted form (notwithstanding encryption performed at the transport layer associated with a secure connection between the user and the system performing the method 700) for the briefest possible period of time.

The method 700 may further include, at block 710, forwarding the encrypted information to the third party from which the encryption key was received. The third party may then decrypt the user information using an associated decryption key. In some embodiments, the system performing the method 700 may not have stored or other access to a decryption key associated with the encryption key. As a result, once encrypted at block 708, the encrypted user information may be unintelligible to any party other than the third party possessing the decryption key, providing an additional layer of security for the user information.

The method may further include, at block 712, deleting the encrypted user information. Such deletion may provide enhanced security by reducing the number of locations in which sensitive user information (even in encrypted form) is stored. In an example, deleting the user's encrypted provided information is in response to receiving a confirmation that the computing action is completed. In other examples, the encrypted user information may be deleted immediately after transmission at block 710.

In some embodiments, the method 700 may include using a single encryption key in connection with multiple different user requests. For example, each of a plurality of encryption keys may be specific to a respective domain, such that a first encryption key is used to encrypt user information associated with a first domain, a second encryption key is used to encrypt user information associated with a second domain, and so on.

Figure 8:
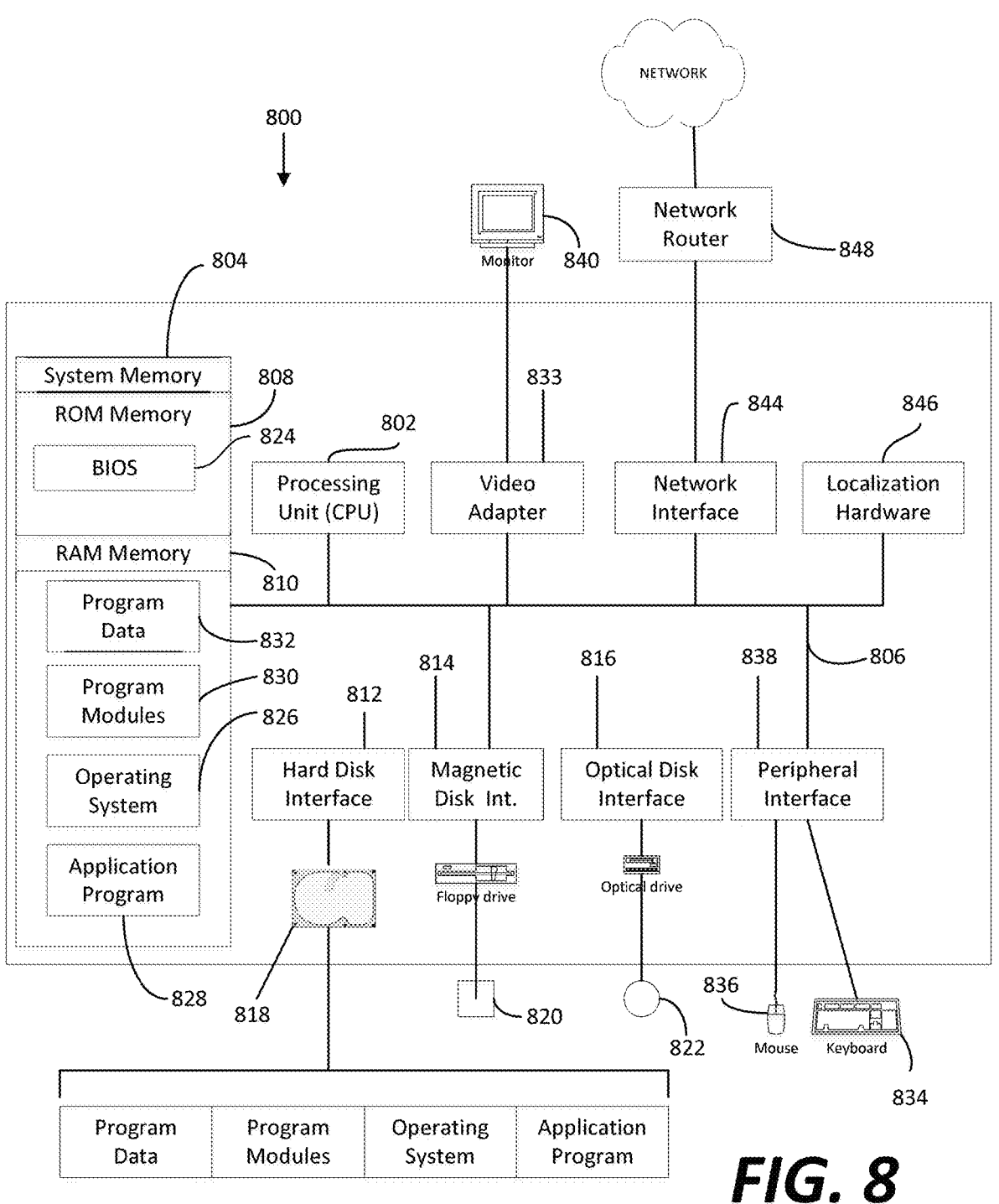
FIG. 8 is a diagrammatic view of an example computing environment.

FIG. 8 is a block diagram of an example computing system, such as a desktop computer, laptop, smartphone, tablet, or any other such device having the ability to execute instructions, such as those stored within a non-transient, computer-readable medium. Furthermore, while described and illustrated in the context of a single computing system 800, those skilled in the art will also appreciate that the various tasks described hereinafter may be practiced in a distributed environment having multiple computing systems 800 linked via a local or wide-area network in which the executable instructions may be associated with and/or executed by one or more of multiple computing systems 800.

In its most basic configuration, computing system environment 800 typically includes at least one processing unit 802 and at least one memory 804, which may be linked via a bus 806. Depending on the exact configuration and type of computing system environment, memory 804 may be volatile (such as RAM 810), non-volatile (such as ROM 808, flash memory, etc.) or some combination of the two. Computing system environment 800 may have additional features and/or functionality. For example, computing system environment 800 may also include additional storage (removable and/or non-removable) including, but not limited to, magnetic or optical disks, tape drives and/or flash drives. Such additional memory devices may be made accessible to the computing system environment 800 by means of, for example, a hard disk drive interface 812, a magnetic disk drive interface 814, and/or an optical disk drive interface 816. As will be understood, these devices, which would be linked to the system bus 806, respectively, allow for reading from and writing to a hard disk 818, reading from or writing to a removable magnetic disk 820, and/or for reading from or writing to a removable optical disk 822, such as a CD/DVD ROM or other optical media. The drive interfaces and their associated computer-readable media allow for the nonvolatile storage of computer readable instructions, data structures, program modules and other data for the computing system environment 800. Those skilled in the art will further appreciate that other types of computer readable media that can store data may be used for this same purpose. Examples of such media include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 800.

A number of program modules may be stored in one or more of the memory/media devices. For example, a basic input/output system (BIOS) 824, containing the basic routines that help to transfer information between elements within the computing system environment 800, such as during start-up, may be stored in ROM 808. Similarly, RAM 810, hard drive 818, and/or peripheral memory devices may be used to store computer executable instructions comprising an operating system 826, one or more applications programs 828, other program modules 830, and/or program data 832. Still further, computer-executable instructions may be downloaded to the computing environment 800 as needed, for example, via a network connection. The applications programs 828 may include, for example, a browser, including a particular browser application and version, which browser application and version may be relevant to determinations of correspondence between communications and user URL requests, as described herein. Similarly, the operating system 826 and its version may be relevant to determinations of correspondence between communications and user URL requests, as described herein.

An end-user may enter commands and information into the computing system environment 800 through input devices such as a keyboard 834 and/or a pointing device 836. While not illustrated, other input devices may include a microphone, a joystick, a game pad, a scanner, etc. These and other input devices would typically be connected to the processing unit 802 by means of a peripheral interface 838 which, in turn, would be coupled to bus 806. Input devices may be directly or indirectly connected to processor 802 via interfaces such as, for example, a parallel port, game port, firewire, or a universal serial bus (USB). To view information from the computing system environment 800, a monitor 840 or other type of display device may also be connected to bus 806 via an interface, such as via video adapter 833. In addition to the monitor 840, the computing system environment 800 may also include other peripheral output devices, not shown, such as speakers and printers.

The computing system environment 800 may also utilize logical connections to one or more computing system environments. Communications between the computing system environment 800 and the remote computing system environment may be exchanged via a further processing device, such a network router 848, that is responsible for network routing. Communications with the network router 848 may be performed via a network interface component 844. Thus, within such a networked environment, e.g., the Internet, World Wide Web, LAN, or other like type of wired or wireless network, it will be appreciated that program modules depicted relative to the computing system environment 800, or portions thereof, may be stored in the memory storage device(s) of the computing system environment 800.

The computing system environment 800 may also include localization hardware 846 for determining a location of the computing system environment 800. In embodiments, the localization hardware 846 may include, for example only, a GPS antenna, an RFID chip or reader, a WiFi antenna, or other computing hardware that may be used to capture or transmit signals that may be used to determine the location of the computing system environment 800. Data from the localization hardware 846 may be included in a callback request or other user computing device metadata in the methods of this disclosure.

The computing system, or one or more portions thereof, may embody a user computing device, token servicer provider, and/or a server, in some embodiments. Additionally, or alternatively, some components of the computing system 800 may embody the user request processing system. For example, the functional modules may be embodied as program modules 830.

In some embodiments, a server-implemented method includes receiving, by a server, a request from a user to initiate a computing action; determining, by the server, that an interface service of a third party for collecting information from the user for the computing action is not available; in response to the determination, presenting, by the server to the user, a substitute interface that matches an appearance respective of the third-party interface service; receiving, by the server from the user via the substitute interface, information for the computing action; encrypting, by the server, the receiving information to generate encrypted computing action information; and transmitting, by the server, the encrypted computing action information to the third party to initiate the computing action.

In some embodiments, the server-implemented method further includes receiving, by the server from the third party, a notification that the computing action has been completed; and in response, transmitting, by the server to the user via the substitute interface, a notification that the computing action has been completed.

In some embodiments, the server-implemented method further includes receiving, by the server from the third party, at least one encryption key; and caching, by the server, the at least one encryption key; wherein the encrypting is according to the at least one encryption key.

In some embodiments, the at least one encryption key corresponds to at least one decryption key held by the third party and configured to decrypt the computing action information; and the server does not receive the at least one decryption key.

In some embodiments, the computing action includes an inter-party transaction; using a shared computing resource; or accessing a secure facility.

In some embodiments, the server-implemented method further includes deleting, by the server, the received information after transmitting the encrypted computing action information to the third party.

In some embodiments, the interface service of a third party is an interface corresponding to a domain, and the method further includes selecting the substitute interface from a plurality of substitute interfaces, wherein each substitute interface in the plurality of substitute interfaces matches an appearance of the third-party interface respective of that domain.

In some embodiments, a non-transitory, computer-readable medium stores instructions that, when executed by a server, cause the server to perform operations including receiving a request from a user to initiate a computing action, the request received through a domain; determining that an interface service of a third party for collecting information from the user for the computing action is not available; in response to the determination: selecting, based on the domain, a substitute interface from a plurality of substitute interfaces, wherein each substitute interface in the plurality of substitute interfaces matches an appearance of the third-party interface respective of that domain; and presenting, to the user, the selected substitute interface; and receiving, from the user via the substitute interface, information for completing the computing action.

In some embodiments, the computer-readable medium stores instructions that, when executed by the server, cause the server to perform further operations including caching at least one encryption key provided by the third party; encrypting the received information using the at least one encryption key to generate encrypted information; and sending the encrypted information to the third party.

In some embodiments, the at least one encryption key corresponds to at least one decryption key configured to decrypt the computing action information, and wherein the server does not receive the at least one decryption key.

In some embodiments, the computer-readable medium stores instructions that, when executed by the server, cause the server to perform further operations including receiving, from the third party, a notification that the computing action has been completed; and in response, transmitting to the user via the substitute interface, a notification that the computing action has been completed.

In some embodiments, the computer-readable medium stores instructions that, when executed by the server, cause the server to perform further operations including deleting the received information after transmitting the encrypted information to the third party.

In some embodiments the computing action including: accessing or storing information; using shared computing resources; sending a communication; submitting personal identification information; accessing funds; or making a payment.

In some embodiments, a computing system may include a non-transitory, computer-readable memory including instructions; and one or more processors configured to read the instructions to cause the computing system to perform operations including: receiving, from a third party, at least one encryption key; caching the at least one encryption key in a key storage module; receiving a request from a user to initiate a computing action; determining that an interface service of the third party for collecting information from the user for the computing action is not available; receiving information from the user for completing the computing action; retrieving, from the key storage module, the at least one encryption key; encrypting the receiving information using the at least one encryption key to generate encrypted computing action information; and transmitting the encrypted computing action information to the third party to cause the third party to complete the computing action.

In some embodiments, the operations further include: in response to the determining that an interface service of the third party is not available, presenting to the user a substitute interface that matches an appearance of the third-party interface service for receiving the information from the user for completing the computing action.

In some embodiments, the interface service of the third party is an interface corresponding to a domain, and wherein the operations further include: selecting the substitute interface from a plurality of substitute interfaces, wherein each substitute interface in the plurality of substitute interfaces matches an appearance of the third-party interface respective of that domain.

In some embodiments, the operations further include: receiving, from the third party, a notification that the computing action has been completed; and in response, transmitting to the user via the substitute interface, a notification that the computing action has been completed.

In some embodiments, the operations further include: deleting the receiving information after transmitting the encrypted computing action information to the third party.

In some embodiments, the computing action includes: accessing or storing information; using shared computing resources; sending a communication; submitting personal identification information; accessing funds; or making a payment.

In some embodiments, the at least one encryption key includes a plurality of encryption keys.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A server-implemented method, comprising:

receiving, by a server, a request from a user to initiate a computing action, the request received through a domain;

determining, by the server, that an interface service of a third party for collecting information from the user for the computing action is not available;

in response to the determination:

selecting, based on the domain, a substitute interface from a plurality of substitute interfaces, wherein each substitute interface in the plurality of substitute interfaces matches an appearance of the third-party interface respective of that domain; and presenting, by the server to the user, the selected substitute interface; and receiving, by the server from the user via the substitute interface, information for the computing action.

2. The server-implemented method of claim 1, further comprising:

receiving, by the server from the third party, a notification that the computing action has been completed; and in response, transmitting, by the server to the user via the substitute interface, a notification that the computing action has been completed.

3. The server-implemented method of claim 1, further comprising:

receiving, by the server from the third party, at least one encryption key; and caching, by the server, the at least one encryption key;

wherein the encrypting is according to the at least one encryption key.

4. The server-implemented method of claim 3, wherein:

the at least one encryption key corresponds to at least one decryption key held by the third party and configured to decrypt the computing action information; and the server does not receive the at least one decryption key.

5. The server-implemented method of claim 1, wherein the computing action comprises:

an inter-party transaction;

using a shared computing resource; or accessing a secure facility.

6. The server-implemented method of claim 1, further comprising:

deleting, by the server, the received information after transmitting the encrypted computing action information to the third party.

7. The server-implemented method of claim 1, wherein the interface service of a third party is an interface corresponding to the domain.

8. A non-transitory, computer-readable medium storing instructions that, when executed by a server, cause the server to perform operations comprising:

receiving a request from a user to initiate a computing action, the request received through a domain;

determining that an interface service of a third party for collecting information from the user for the computing action is not available;

in response to the determination:

selecting, based on the domain, a substitute interface from a plurality of substitute interfaces, wherein each substitute interface in the plurality of substitute interfaces matches an appearance of the third-party interface respective of that domain; and presenting, to the user, the selected substitute interface; and receiving, from the user via the substitute interface, information for completing the computing action.

9. The non-transitory, computer-readable medium of claim 8, wherein the operations further comprise:

caching at least one encryption key provided by the third party;

encrypting the received information using the at least one encryption key to generate encrypted information; and sending the encrypted information to the third party.

10. The non-transitory, computer-readable medium of claim 9, wherein the at least one encryption key corresponds to at least one decryption key configured to decrypt the computing action information, and wherein the server does not receive the at least one decryption key.

11. The non-transitory, computer-readable medium of claim 9, wherein the operations further comprise:

receiving, from the third party, a notification that the computing action has been completed; and in response, transmitting to the user via the substitute interface, a notification that the computing action has been completed.

12. The non-transitory, computer-readable medium of claim 9, wherein the operations further comprise:

deleting the received information after transmitting the encrypted information to the third party.

13. The non-transitory, computer-readable medium of claim 8, wherein the computing action comprises:

accessing or storing information;

using shared computing resources;

sending a communication;

submitting personal identification information;

accessing funds; or making a payment.

14. A computing system, comprising:

a non-transitory, computer-readable memory comprising instructions; and one or more processors configured to read the instructions to cause the computing system to perform operations comprising:

receiving, from a third party, at least one encryption key;

caching the at least one encryption key in a key storage module;

receiving a request from a user to initiate a computing action;

determining that an interface service of the third party for collecting information from the user for the computing action is not available;

receiving information from the user for completing the computing action;

retrieving, from the key storage module, the at least one encryption key;

encrypting the receiving information using the at least one encryption key to generate encrypted computing action information; and transmitting the encrypted computing action information to the third party to cause the third party to complete the computing action.

15. The computing system of claim 14, wherein the operations further comprise:

in response to the determining that an interface service of the third party is not available, presenting to the user a substitute interface that matches an appearance of the third-party interface service for receiving the information from the user for completing the computing action.

16. The computing system of claim 15, wherein the interface service of the third party is an interface corresponding to a domain, and wherein the operations further comprise:

selecting the substitute interface from a plurality of substitute interfaces, wherein each substitute interface in the plurality of substitute interfaces matches an appearance of the third-party interface respective of that domain.

17. The computing system of claim 15, wherein the operations further comprise:

receiving, from the third party, a notification that the computing action has been completed; and in response, transmitting to the user via the substitute interface, a notification that the computing action has been completed.

18. The computing system of claim 14, wherein the operations further comprise:

deleting the receiving information after transmitting the encrypted computing action information to the third party.

19. The computing system of claim 14, wherein the computing action comprises:

accessing or storing information;

using shared computing resources;

sending a communication;

submitting personal identification information;

accessing funds; or making a payment.

20. The computing system of claim 14, wherein the at least one encryption key comprises a plurality of encryption keys.

\* \* \* \* \*